United States Patent [19]
Carter

[11] Patent Number: 5,907,705
[45] Date of Patent: May 25, 1999

[54] COMPUTER IMPLEMENTED REQUEST TO INTEGRATE (RTI) SYSTEM FOR MANAGING CHANGE CONTROL IN SOFTWARE RELEASE STREAM

[75] Inventor: Bruce Carter, Los Angeles, Calif.

[73] Assignee: Sun Microsystems, Inc., Palo Alto, Calif.

[21] Appl. No.: 08/741,819

[22] Filed: Oct. 31, 1996

[51] Int. Cl.[6] ................................................. G06F 9/44
[52] U.S. Cl. ............................................................ 395/701
[58] Field of Search .................................... 395/701, 702, 395/703

[56] References Cited

U.S. PATENT DOCUMENTS

| | | | |
|---|---|---|---|
| 5,745,754 | 4/1998 | La garde et al. | 707/104 |
| 5,752,246 | 5/1998 | Rogers et al. | 707/104 |

FOREIGN PATENT DOCUMENTS

| | | | |
|---|---|---|---|
| 0541875 | 5/1993 | European Pat. Off. | G06F 9/44 |

OTHER PUBLICATIONS

Garland, J.K., et al., "Improved Change Tracking for Software Maintenance." Proceedings of the Conference on Software Maintenance, Sorrento, pp. 32–41 (1991).
Reuter, J., et al., "Distributed Revision Control Via the World Wide Web." Software Configuration Management XP000617828, pp. 166–174 (1996)..

*Primary Examiner*—James P. Trammell
*Assistant Examiner*—John Q. Chavis
*Attorney, Agent, or Firm*—David G. Alexander

[57] ABSTRACT

Change control in a software release stream is managed by a computer implemented Request To Integrate (RTI) system, including at least one user unit having an input unit and a display. A server unit which is connected to the user unit(s) creates and stores RTI files representing requests to integrate changes into the software release stream, and enables a selected RTI file to be displayed on the display unit under control of the input unit. The server unit includes a database in which the RTI files are stored under the Source Code Control System (SCCS), and a search engine for searching the database and displaying selected RTI files and their histories. The RTI files are in World Wide Web (WWW) HyperText Markup Language (HTML) text format, and are accessible through a WWW browser in the user unit(s) and a cooperating WWW server in the server unit. The server unit stores and executes a program including a WWW home page, and developer, evaluator and gatekeeper pages which are accessible through the home page. RTI files are created, edited, viewed, approved, placed on hold, canceled and integrated into the software release stream through the WWW page hierarchy by entering data through the input unit(s). The system further includes a software bug database which is accessible through hyperlinks in the WWW pages, and a user database which limits access to verified users.

23 Claims, 11 Drawing Sheets

COMPUTER IMPLEMENTED REQUEST TO INTEGRATE (RTI) SYSTEM FOR MANAGING CHANGE CONTROL IN SOFTWARE RELEASE STREAM

BACKGROUND OF THE INVENTION

1. Field of the Invention

The present invention generally relates to the art of computer software development, and more specifically to a computer implemented request to integrate (RTI) system for managing change control in a software release stream.

2. Description of the Related Art

Computer technology has evolved to the extent that commercially successful application programs are extremely large and complex, and require the coordinated efforts of a number of persons to produce a finished product.

The scope of these applications requires that modules of program code be written and debugged by individual programmers, also known as developers, working in parallel. It is necessary to coordinate and integrate the developers' work products to produce a complete application program.

Additions, modifications, bug fixes, etc. can be made to a partially completed version of a program using the concept of a "software release stream". Code changes are proposed by developers in the form of "Requests To Integrate (RTI)", which are evaluated by other individuals in view of their merit and the development status of the program. The software release stream at any given time consists of the core program including previously integrated changes, and pending RTIs.

An important business objective is to maintain a fluid and controlled software release cycle. Group workspace hierarchies are used to manage the development, integration and release of software. It is essential to minimize development overhead yet provide the necessary change control needed to track software releases based upon bug fixes, code changes, feature releases, product enhancements and documentation changes.

Software release stream management has previously been performed using combinations of pencil and paper lists, improvised database files, e-mail messages, etc., which are prone to omissions, errors, and data loss.

A need exists in the art for an automated software release stream management system which positively tracks all RTIs from initial creation to final integration into one or more release streams, and enables developers, evaluators, gatekeepers, and other interested persons to access the entire RTI database of relevant projects.

SUMMARY OF THE INVENTION

It is an object of the present invention to fulfill the need which has existed in the prior art for a coherent and comprehensive automated software release stream change control management system.

In accordance with the present invention, change control in a software release stream is managed by a computer implemented Request To Integrate (RTI) system, including at least one user unit having an input unit and a display.

A server unit which is connected to the user unit(s) creates and stores RTI files representing requests to integrate changes into the software release stream, and enables a selected RTI file to be displayed on the display unit under control of the input unit.

The server unit includes a database in which the RTI files are stored under the Source Code Control System (SCCS), and a search engine for searching the database and displaying selected RTI files and their histories.

The RTI files are in World Wide Web (WWW) HyperText Markup Language (HTML) text format, and are accessible through a WWW browser in the user unit(s) and a cooperating WWW server in the server unit.

The server unit stores and executes a program including a WWW home page, and developer, evaluator and gatekeeper pages which are accessible through the home page. RTI files are edited, viewed, approved, placed on hold, canceled and integrated into the software release stream through the WWW page hierarchy by entering data through the input unit(s).

The system further includes a software bug database which is accessible through hyperlinks in the WWW pages, and a user database which limits access to verified users.

These and other features and advantages of the present invention will be apparent to those skilled in the art from the following detailed description, taken together with the accompanying drawings, in which like reference numerals refer to like parts.

DETAILED DESCRIPTION OF THE INVENTION

Figure 1:
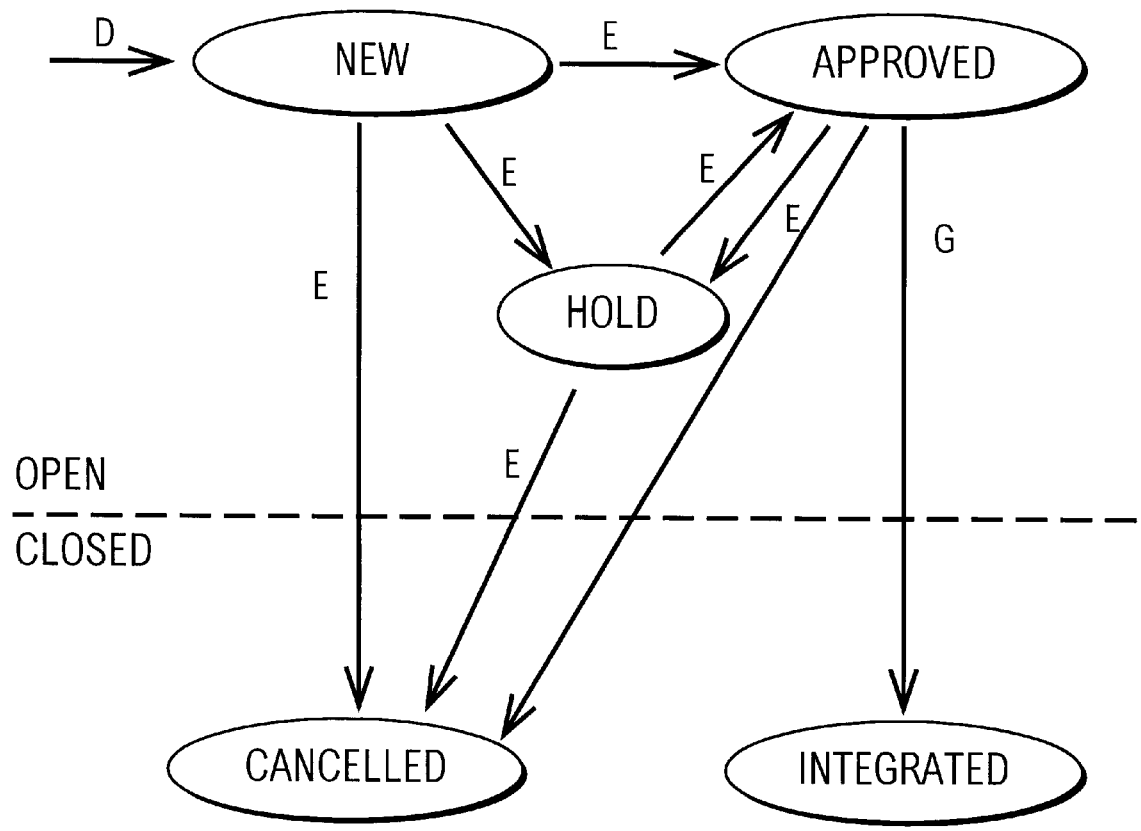
FIG. 1 is a state diagram of the present system.

Introduction and Request to Integrate (RTI) Process Workflow

The present invention is especially suited to a medium to large software organization with a number of software projects. The invention is a software engineering tool used by developers, integrators and managers to manage the software release change control process, and is used as an adjunct to "TeamWare" (development group) software integration tools.

The overall business objective which is accomplished by a system according to the present invention is maintaining a fluid and controlled software release cycle. TeamWare workspace hierarchies are used to manage the development, integration and release of software. Integration consists of merging the changes made by individual developers with one or more release streams.

Request-To-Integrate (RTI) is a mechanism by which change control can be managed. An important strategy is to minimize development overhead yet provide the necessary change control needed to track software releases based upon bug fixes, code changes, feature releases, product enhancements and documentation changes.

The present invention implements the RTI mechanism and process, provides a change review team with data for making decisions regarding change management and quality control, and further provides a release engineering team with data for building components for software release.

Major User Profiles

1. A Developer is a member of the development engineering staff. The Developer creates code or modifies existing code to release new software, enhance existing software or fix bugs in existing software. The Developer initiates the RTI process by submitting a request to integrate his code changes into a release stream.

2. An Evaluator is a member of the development engineering staff and acts in the role of integration team leader. The Evaluator reviews a Developers RTI submission and checks it for correctness. The Evaluator may approve or disapprove any code changes to the code base.

3. A Gatekeeper is a member of the release engineering staff. The Gatekeeper controls putback access to the TeamWare workspace hierarchies and builds the software release based upon information in the RTI. "Putback" involves merging the history files for an RTI, whereas "build" involves merging the program code itself.

4. A Change Review Team (CRT) is a collection of personnel from development engineering, release engineering, test engineering and technical publications. They typically meet weekly and review collectively the RTI submissions active in the system.

5. A Tester is a member of the test engineering staff. The tester performs quality and system level testing of software releases for final release approval. Testers may use the RTI system to browse for information to support the testing activity.

6. A System Administrator is a member of the release engineering staff. The system administrator maintains the RTI system and makes any modifications required to tailor the system for project specific needs.

Major RTI Processes

1. RTI creation

The present RTI system provides a form fill-in method for Developers to create RTIs to identify proposed changes to the code base. The data provided in the RTI provides the CRT with the information needed to assess whether or when an RTI will be accepted.

An RTI typically includes: a list of source file changes, creates, deletions or renames; list of bugids (software bug identifications); a pointer to the unit test plan and results; a code review sign-off; a project-specific checklist of completed tasks required before check-in; the name of the project or release stream into which the integration is to occur; the name of the originator.

RTI State Transitions

As illustrated in FIG. 1, when an RTI is submitted into the system it has the state of "New". RTIs belong to one of two super-states: Open or Closed. In the Open super-state, an RTI can be New, Approved or on Hold. In the Closed super-state, an RTI can be either Canceled or Integrated.

When an RTI is submitted, the system checks the validity of certain fields within the RTI and refuses the submission when errors are detected. The system further checks the bug tracking system to verify that all bugids listed in the RTI gave the bug state of "evaluated", as listed in TABLE I below.

TABLE I

RTI STATES VS BUG STATES UPON SUCCESSFUL SUBMISSION

| RTI State | Bug State |
|---|---|
| New | evaluated |
| Approved | committed |
| Integrated | fixed, integrated |

The system sends an e-mail notification to the originator, the Evaluator and the Gatekeeper for the project. The system may optionally copy other interested parties. The system stores the RTI as an ASCII file and names it using the next available RTI number.

2. RTI evaluation

New RTIs can transition to one of 3 states: Approved, Hold or Canceled. Transition is based upon the careful scrutiny and action taken by the Evaluator(s). A regular meeting is held by the CRT to collectively evaluate RTIs that have beet submitted. The CRT consists of members of development engineering, release engineering, test engineering and technical publications.

The project RTI Evaluators will have received system notification of any new RTIs or state changes to existing RTIs since the previous meeting. At the CRT meeting, each project RTI Evaluator is able to summarize for the team and provide an opinion for approval action or disposition for RTIs under review. The system provides an RTI summary report for the purposes of the CRT meeting.

RTI Evaluation Criteria

An Evaluator will examine the information provided in the RTI, and based upon several factors make a decision whether to approve the RTI or not. One of the strategies used includes cross-checking information found in the bug report identified by the bugids in the RTI with other information in the RTI such as the list of affected source files.

Another strategy is to consult with the code reviewer identified in the RTI regarding the proposed changes. The Evaluator may follow a strategy to check for software interface compliance. The test plan and results are reviewed and examined for completeness. A project-specific check-in checklist is reviewed to assess software readiness.

When the Evaluator approves the RTI, the system changes the state of the RTI to "Approved" and sends e-mail notification to the interested parties, marks the bugids listed in the RTI as "committed" within the bug tracking system, and logs the action.

The principal target of the approval notification is the project Gatekeeper who upon receipt of the approval notification opens the gate and permits the Developer to put back his changes and merge them with the release stream.

If the Evaluator determines the RTI is not ready for approval, he may place the RTI in a "Hold" state. Again, the system sends e-mail notification to the interested parties. The Evaluator may add information to the RTI by using the Update action. As with the state change actions, an Update action will result in the system sending an e-mail notification to the interested parties.

Finally, the Evaluator may choose to Cancel an RTI when it is in any of the Open states. The Evaluator may only approve an RTI for the current integration build and not for any future builds.

3. RTI Updating

The system allows Developers or Evaluators to update an RTI as long as it is in the Open super-state. Updates are performed in a free-form edit mode with access to all fields of information.

When an update action has been submitted, the system sends an e-mail notice to the interested parties. The system maintains a history log of all RTI changes, and provides a way to review the history log.

The log identifies who made the change based upon: e-mail address, remote host name and remote host address. The system utilizes a file locking mechanism to prevent overwriting due to simultaneous updates by different users. The system makes it possible for more than one person to work on an RTI, including Developers other than the originator.

4. RTI Integration

When the Evaluator approves an RTI, the Gatekeeper opens the gate and grants permission for the putback to occur. The Gatekeeper knows who to open the gate for by reading the RTI and identifying the RTI originator.

Following the successful putback, the Gatekeeper build-stamps the RTI with the name of the build, and moves the RTI to an Integrated state. This transition places the RTI into the Closed super-state. All bugids listed in the RTI are marked within the bug tracking system as "Fixed in" and "Integrated in" for the name of the release build. The system sends an e-mail notification to all the interested parties upon the state transition, and logs the action.

5. RTI Holding

An RTI may be placed into a "Hold" state by the Evaluator. The Evaluator may place the RTI on hold if the state is New or Approved. The hold state is useful if project circumstances are changing and it is not clear when the RTI can be approved for a current integration build, yet the situation is not bad enough to warrant a cancellation if there is a chance that the RTI can be integrated soon. The system sends an e-mail notification to all the interested parties upon the state transition, and logs the action.

6. RTI Cancellation

It may become necessary to Cancel an RTI due to changing circumstances on a project. Only the Evaluator may make this RTI transition. The system sends an e-mail notification to all the interested parties, and logs the action.

7. RTI Reporting

The system provides a number of reporting mechanisms, including the following.

Action Log—The action log is of primary importance to the RTI system administrator, and provides a centralized, running history of RTI system usage to aid in system maintenance.

Whenever a system action occurs which results in an RTI state change or update, a message is written to a logfile that preferably includes: timestamp, action, project, RTI, e-mail address of user, remote host name, remote host address.

Access log—The system provides a log of messages that indicate which RTIs have been accessed for viewing or printing. This is also of primary importance to the RTI system administrator.

E-mail notification—The system sends an e-mail notification to all interested parties whenever an RTI state change occurs or an RTI update occurs.

RTI history—The system provides a way to view the change history for an open RTI.

Viewing RTIs—The system provides the ability to view any open or search-retrieved RTI.

Printing RTIs—The system provides the ability to print any open or search-retrieved RTI.

Searching RTIs—The system provides a search engine for locating RTIs by keyword search and present them for viewing or printing. The search engine provides a capability adjust the scope of the search for RTIs based upon projects selected.

Database reports—The system provides the off-line ability to report on the current status of the RTI database based upon user-selectable parameters.

Release memos—The system provides the off-line ability to report on the change content in a release based upon the Integrated RTIs.

CRT report—The system automatically generates an off-line RTI report tailored specifically for the needs of the CRT meeting.

8. RTI database management

The system organizes and stores RTIs in a hierarchical fashion as separate ASCII files under SCCS, which provides the file locking and file history mechanisms. RTIs are organized by project. Under each project, there is a secondary level corresponding to the RTI super-states—Open and Closed.

The format of the RTI file can be project-specific to allow for variances in project requirements. Although each project could in theory use a different file format, in practice it is efficient and useful to use the same format for all projects if possible. Except during the RTI Create process, where form fill-in is used, variances in RTI file formats should be transparent to the user and not be reflected in or impact the overall RTI system User Interface model.

Main System Components

Figure 2:
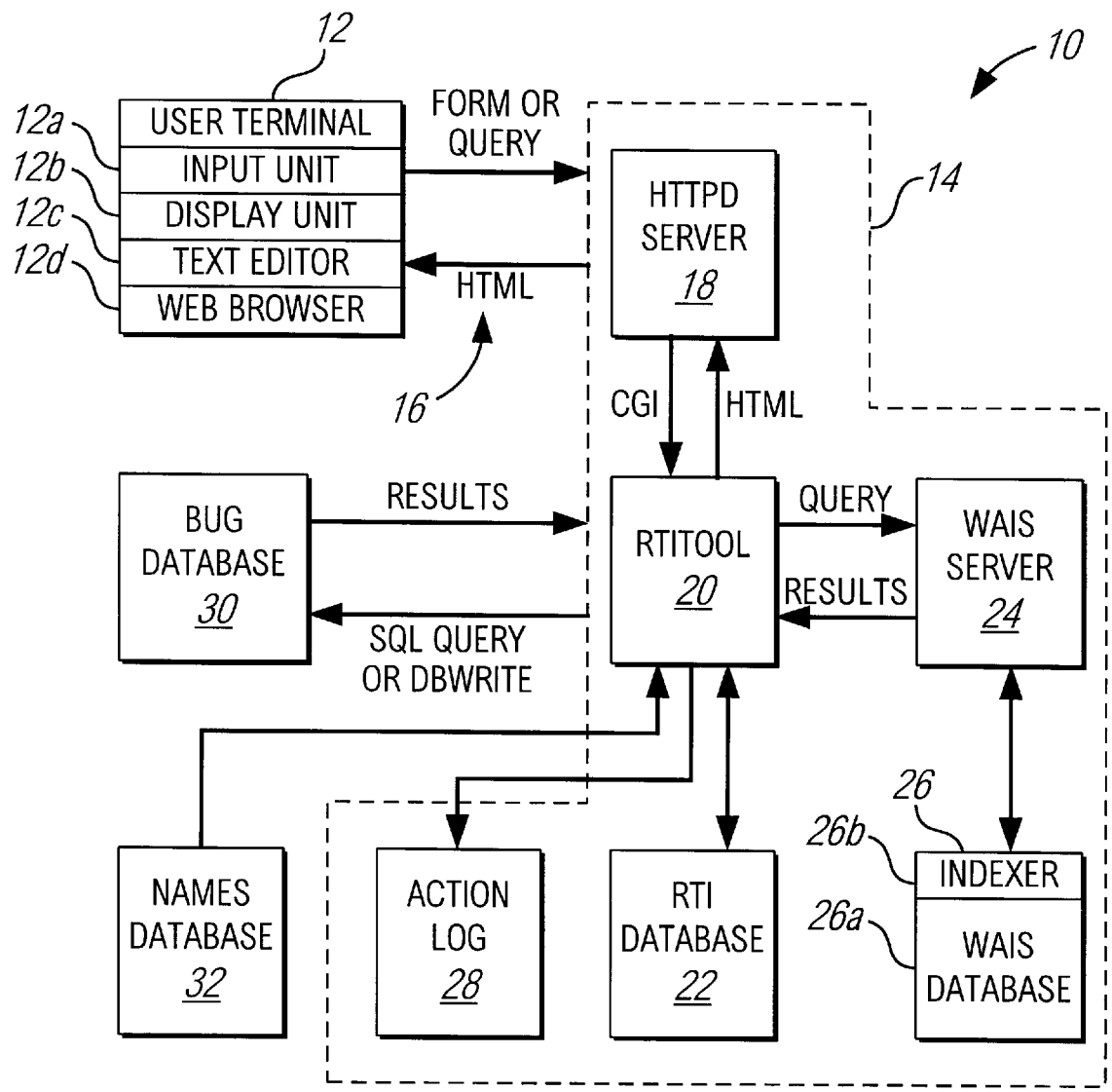
FIG. 2 is a block diagram illustrating a computer implemented request to integrate (RTI) system for managing change control in a software release stream according to the present invention.

As illustrated in FIG. 2, a computer implemented Request To Integrate (RTI) system 10 for managing change control in a software release stream according to the present invention includes at least one user unit or terminal 12 which is typically implemented as a personal computer workstation. A preferred workstation is a SUN SPARC terminal running a version of the UNIX operating system, although the invention can be practiced using a variety of other personal computers and operating systems.

The terminal 12 includes an input unit 12a having one or more input devices such as a keyboard and a mouse which enable a user to input commands and data into the system 10. Although not explicitly illustrated, the terminal 12 is further provided with a processor unit, volatile and non-volatile data storage units, and other conventional devices. A display unit 12b such as a cathode ray tube or liquid crystal monitor displays alphanumeric and graphical data which is required for implementing the system 10, and a text editor 12c.

In accordance with the present invention, the terminal 12 further includes a World Wide Web (WWW) browser 12d such Netscape that enables the terminal 12 to directly read WWW page files which are preferably clear text ASCII files written in HyperText Markup Language (HTML).

The browser 12d utilizes the text editor 12c, which is preferably Java based, to edit RTI files that are created by a developer. The Java text editor 12c enables the terminal 12 to be based on other than a SPARC/UNIX configuration, for example an IBM PC platform running Microsoft Windows.

The system 10 further comprises a server unit 14 which is connected to the terminal 12. Although only one terminal 12 is illustrated in the drawing, in a practical application a plurality of terminals 12 will be provided at locations remote from the server unit 14, and connected thereto by a Wide Area Network (WAN), Local Area Network (LAN), etc. as indicated at 16.

Typically, each programmer or developer will have an individual terminal 12 which is used for developing program code as well as creating and managing RTIs, sending and receiving e-mail, and performing a variety of other tasks. Management and supervisory personnel will also be provided with their own terminals. For simplicity of description, however, the terminal 12 will be referred to in the singular, keeping mind that in a preferred application there will be a plurality of terminals 12.

The server unit 14 includes a WWW (httpd) server 18 which communicates with the browser 12d of the terminal 12. This enables a user to input a form or query to the server 18, and receive data back as HTML code for display on the display unit 12b.

The program code which implements the functionality of the invention includes a "Rtitool" 20 which is stored in memory and executed by a processor (not shown) of the server unit 14. The Rtitool 20 includes a WWW page hierarchy which will be described in detail below.

The server unit 14 further includes an RTI database 22 which preferably stores RTI files under the Source Code Control System (SCCS) protocol. The Rtitool 20 includes program code which enables it to access the database 22 using a conventional Wide Area Information System (WAIS) server 24 via a WAIS database unit 26 which includes a WAIS database 26a and an indexer 26b.

The Rtitool 20 further includes program code Which enables it to communicate with a software bug database 30 and a names database 32 via the WAN 16, and an action log 28 which lists actions performed by the system 10. The bug database 30 is preferably a Sybase system, and is queried by the Rtitool 20 using conventional SQL or dbwrite language.

The present system 10 is a web (WWW) based application. FIG. 2 illustrates the basic information flow through the Rtitool 20, the web server 18, and the client or user via the terminal 12. A Common Gateway Interface (CGI) provides communication between a gateway of the Rtitool 20 and the web server 18. When the user enters text on a form or in response to a query using the input unit 12a and hits a return key, the web browser 12d sends keystrokes captured from the user to the httpd server 18. The httpd server 18 accepts the input, starts up the Rtitool 20, and hands the input to the Rtitool 20 via the CGI.

The user's keystrokes are passed to Rtitool 20 either via environment variables (called the GET method) or using standard input (called the POST method). The Rtitool 20 then parses the input and processes it. The Rtitool 20 may generate HTML output, which is returned to the httpd server 18 to pass to the user, or it may save data to a file or database or send e-mail to a relevant person. The Rtitool 20 gateway is preferably written in Perl.

Web Page Hierarchy

Figure 3:
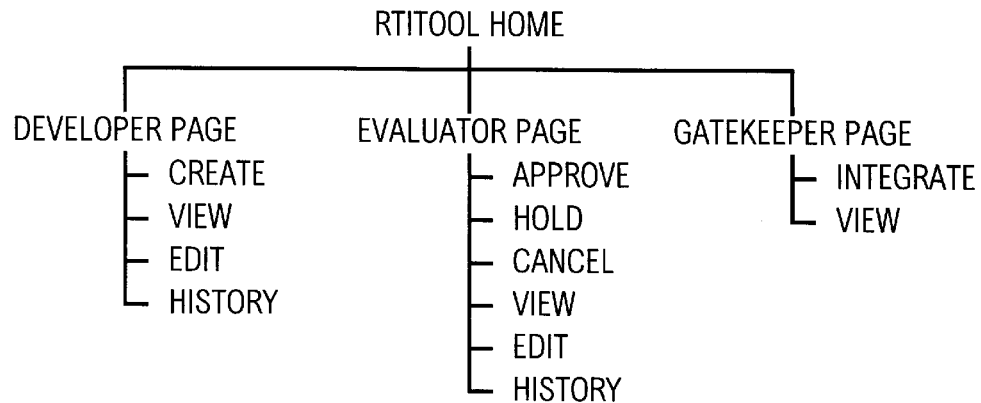
FIG. 3 is a diagram illustrating a World Wide Web (WWW) home page arrangement of a server unit of the system of FIG. 1.
Figure 4:
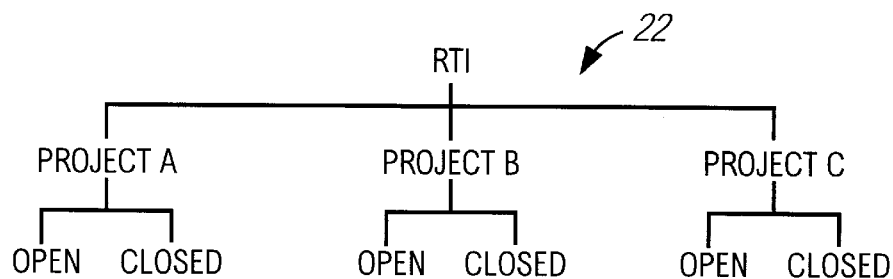
FIG. 4 is a diagram illustrating the organization of Request To Integrate (RTI) files in the system.

The system 10 as viewed by the user on the display unit 12b is a hierarchical configuration of web pages and RTI files which are arranged as illustrated in FIGS. 3 and 4.

As viewed in FIG. 3, the Rtitool 20 includes a WWW home page, and developer, evaluator, and gatekeeper pages which are accessible through the home page.

The developer page enables access to subpages which enable a developer to create, view, edit and list the history of a selected RTI in response to developer data which is applied as user inputs to the input unit 12a of the terminal 12. The evaluator page enables an evaluator to approve, place on hold, cancel, view, edit, and list the history of an RTI. The gatekeeper page enables a gatekeeper to integrate or view an RTI.

As viewed in FIG. 4, RTIs are stored as WWW (.html) files in the database 22, and are organized by project. A project normally corresponds to a single TeamWare workspace. RTIs are always in one of 2 super-states: Open or Closed. Their location within the file organization parallels the super-state of the RTI.

Figure 5A:
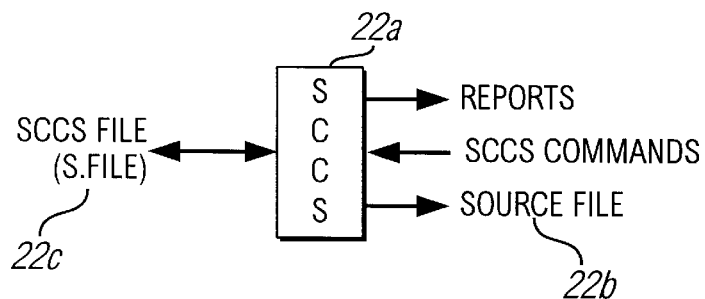
FIGS. 5a and 5b are diagrams illustrating how the RTI files are managed under the Source Code Control System (SCCS) protocol in accordance with the invention.
Figure 5B:
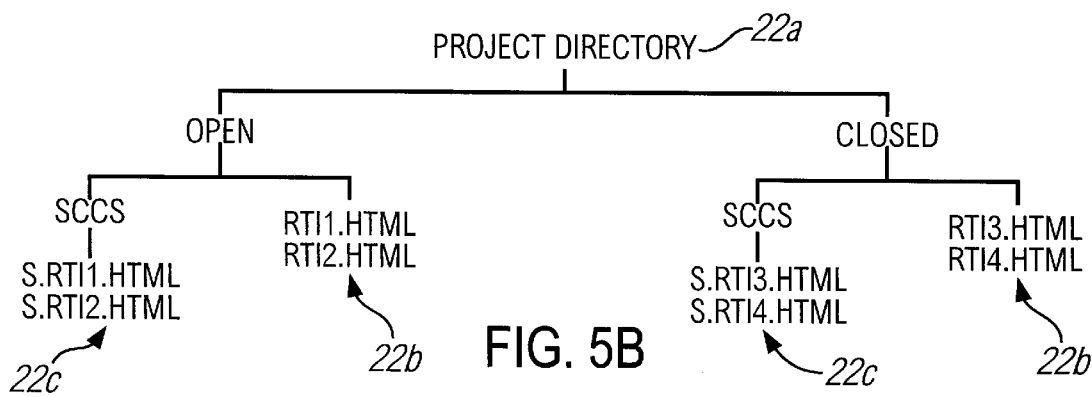

FIGS. 5a and 5b illustrate how an RTI file is stored in the database 22. An RTI file is created by a developer as a clear text ASCII file in HTML format via the web page hierarchy which is collectively designated as 20a in FIG. 5, with a file extension of .html. A SCCS system 22a which manages the database 22 creates, in addition to the .html source files 22b, an SCCS file 22c.

The SCCS system 22a stores original RTI files, but does not store changed RTI files per se. Instead, the system 22a stores changes to an original .html file in the SCCS file 22c as a "delta", which consists of only the changes themselves.

This results in efficient file management due to the reduction in data which must be stored (original file+changes). The SCCS file 22c lists the change history of the RTI in the form of a list of the "deltas", including the name of the person making a change, the items that were changed, and other relevant data.

Figure 6:
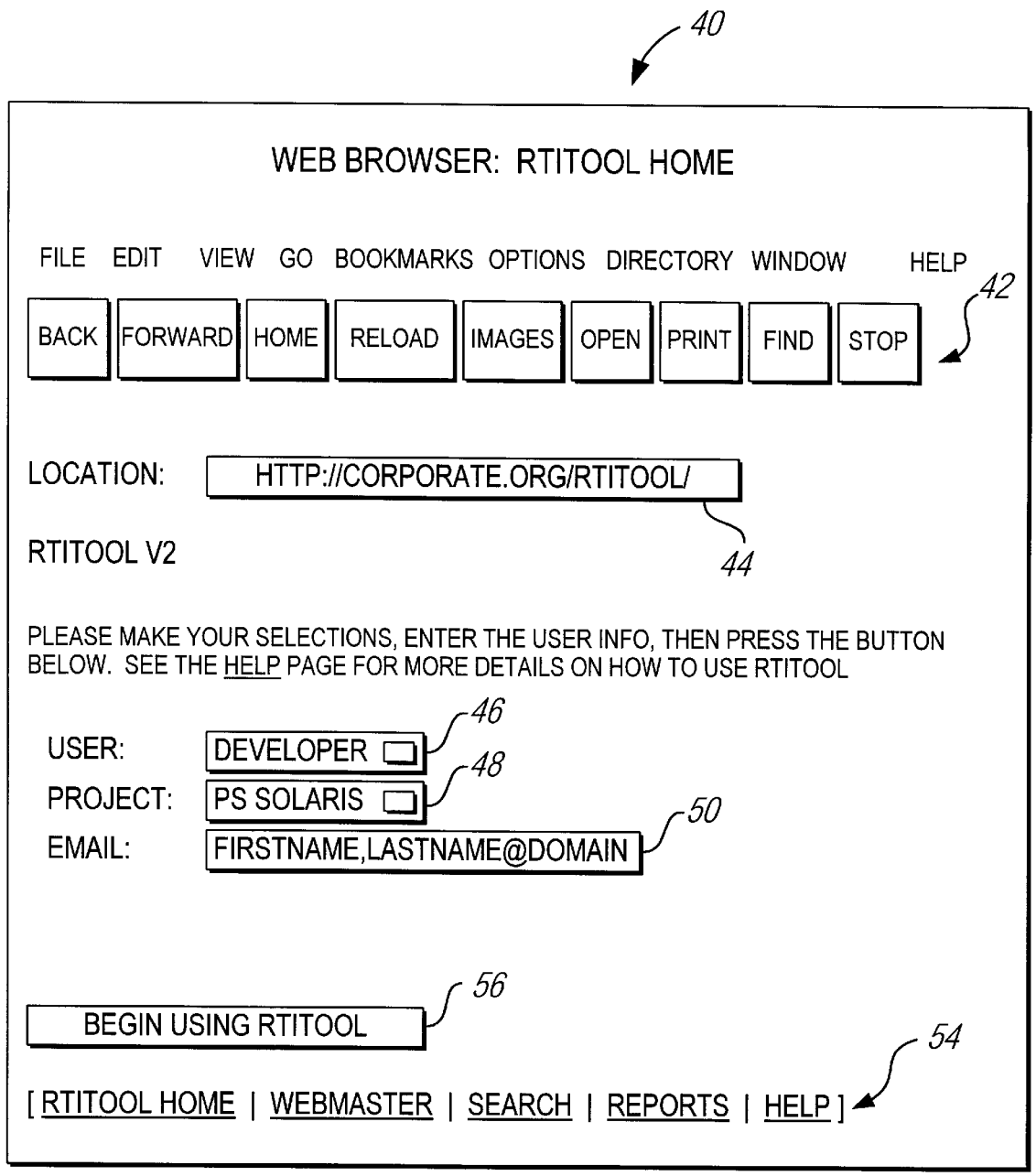
FIG. 6 is a simplified illustration of a home page display of the system.

FIG. 6 is a simplified view of the home page 40 of the Rtitool 20. The home page 40 is viewed using the browser 12d in the same manner as viewing any other page on the World Wide Web (WWW), and includes a number of generic submit buttons 42 which enable a user to navigate through a web site. The home page 40 is accessed by means of a location window 44 which enables a user to locate the home page 40 by typing its Uniform Resource Locator (URL) therein.

A button 46 is provided which enables the user to select a role (developer, evaluator, gatekeeper) by means of a pointing device (e.g. mouse) of the input unit 12a. Although not explicitly illustrated, clicking on the button 46 causes a dialog box to be displayed which includes a list of roles from which the user can select.

A similar button 48 is provided to open a dialog box list display which enables the user to select a project from a list which is structured as shown in FIG. 4. A box 50 enables a user to identify himself by typing in his e-mail address, which represents a user name to the system 10.

The home page 40 further preferably includes hypertext links 54 to, for example, the home page 40 itself, a webmaster (the system administrator) function, the search engine (WAIS server 24), a report generator of the Rtitool 20, and a help system.

After the various options have been selected as described above, the user clicks on a button 56 which causes the page corresponding to the selected role to be displayed using the browser 12d.

Figure 7:
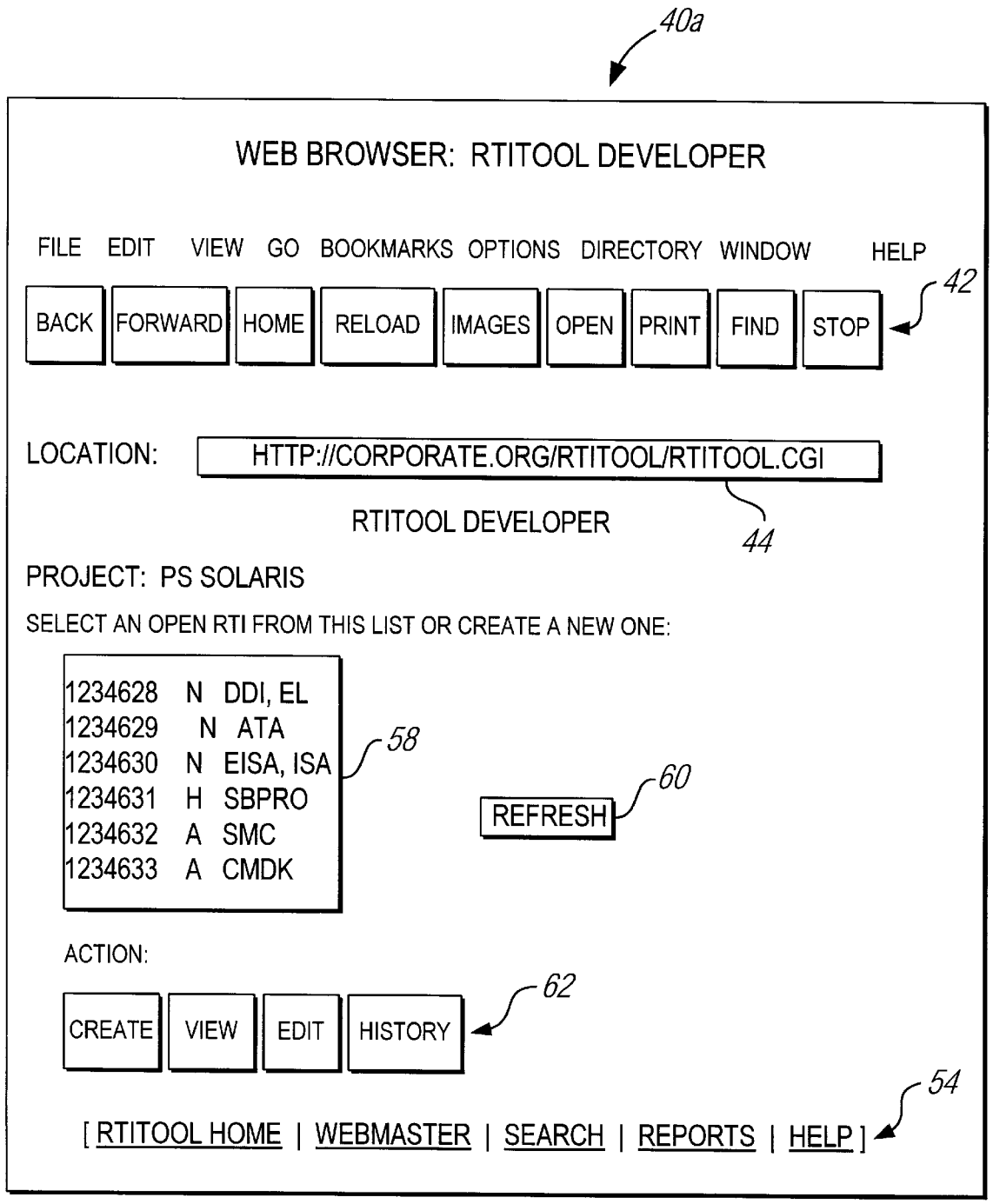
FIG. 7 is similar to FIG. 6 but illustrates a developer page display.

FIG. 7 illustrates the developer page which is designated as 40a, in which like elements are designated by the same reference numerals as in FIG. 6. The developer page 40a includes a "picklist" box 58 which displays a list of RTIs which have been previously selected or opened. An RTI can be selected by clicking on its name in the box 58 (e.g. 1234628 N ddi, el). A refresh button 60 enables the list in the box 58 to be updated.

Submit buttons 62 enable a new RTI to be created, or an RTI which was selected from the box 58 to be viewed, edited, or its history displayed. It will be noted that the buttons 62 correspond to the subpages listed in FIG. 3.

Although not explicitly illustrated, clicking on one of the buttons 62 brings up a create, view, edit or history subpage which includes options for performing a corresponding function via inputs from the input unit 12a. The evaluator and gatekeeper pages and their corresponding subpage, although similarly not explicitly illustrated, are also accessible through the home page 40. These pages preferably include hyperlinks which enable access to, for example, the bug database 30.

In this manner, all of the applicable functions of the system 10 are accessible through the WWW page hierarchy of the Rtitool 20.

FIGS. 8a to 8f in combination constitute a flowchart of the operation of the hierarchical structure of the Rtitool 20 WWW pages.

Figure 8A:
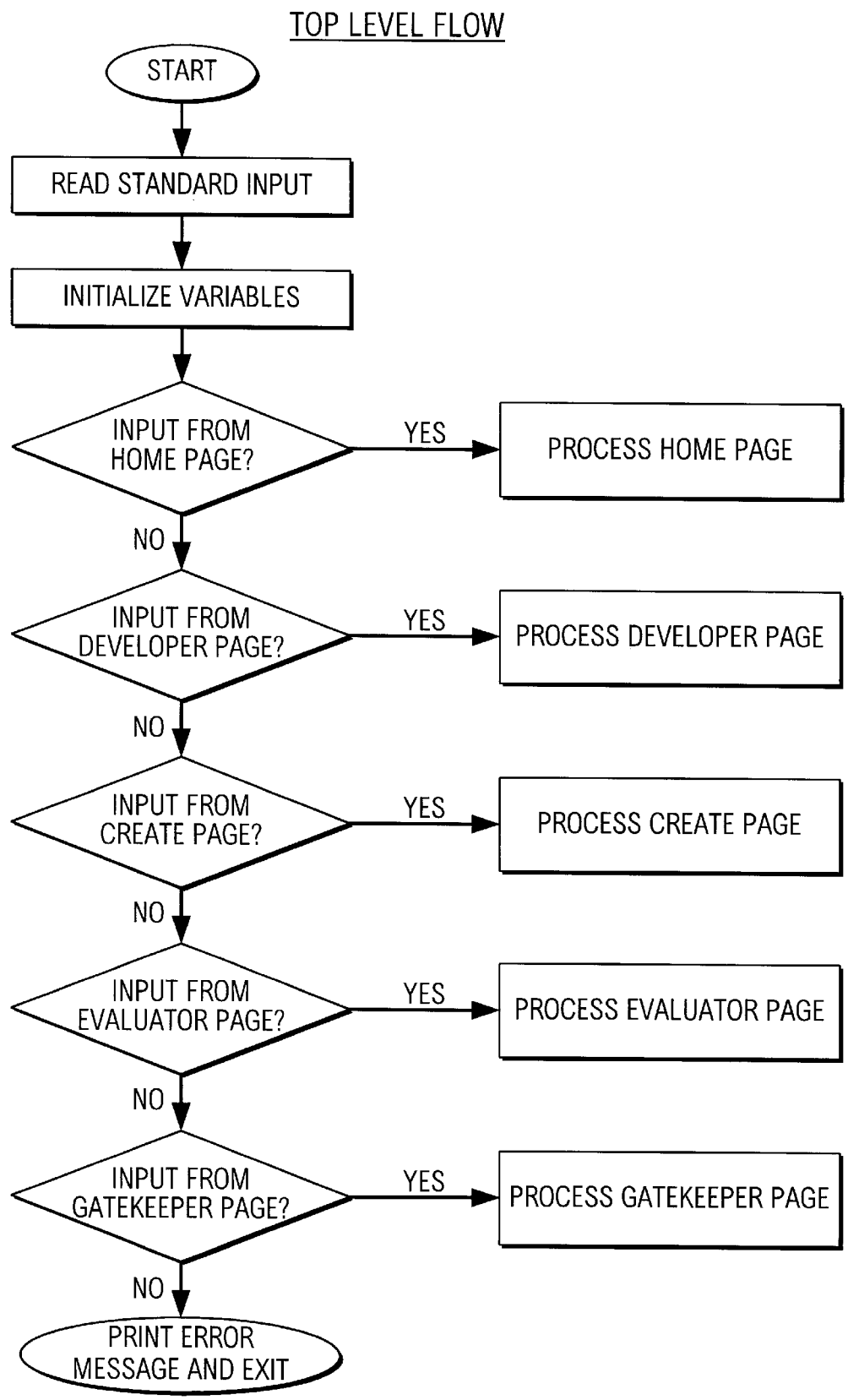
FIGS. 8a to 8f in combination constitute a simplified flowchart of the operation of the system.

FIG. 8a is a top level flow diagram illustrating how the user inputs are parsed to determine which page is to be processed.

Figure 8B:
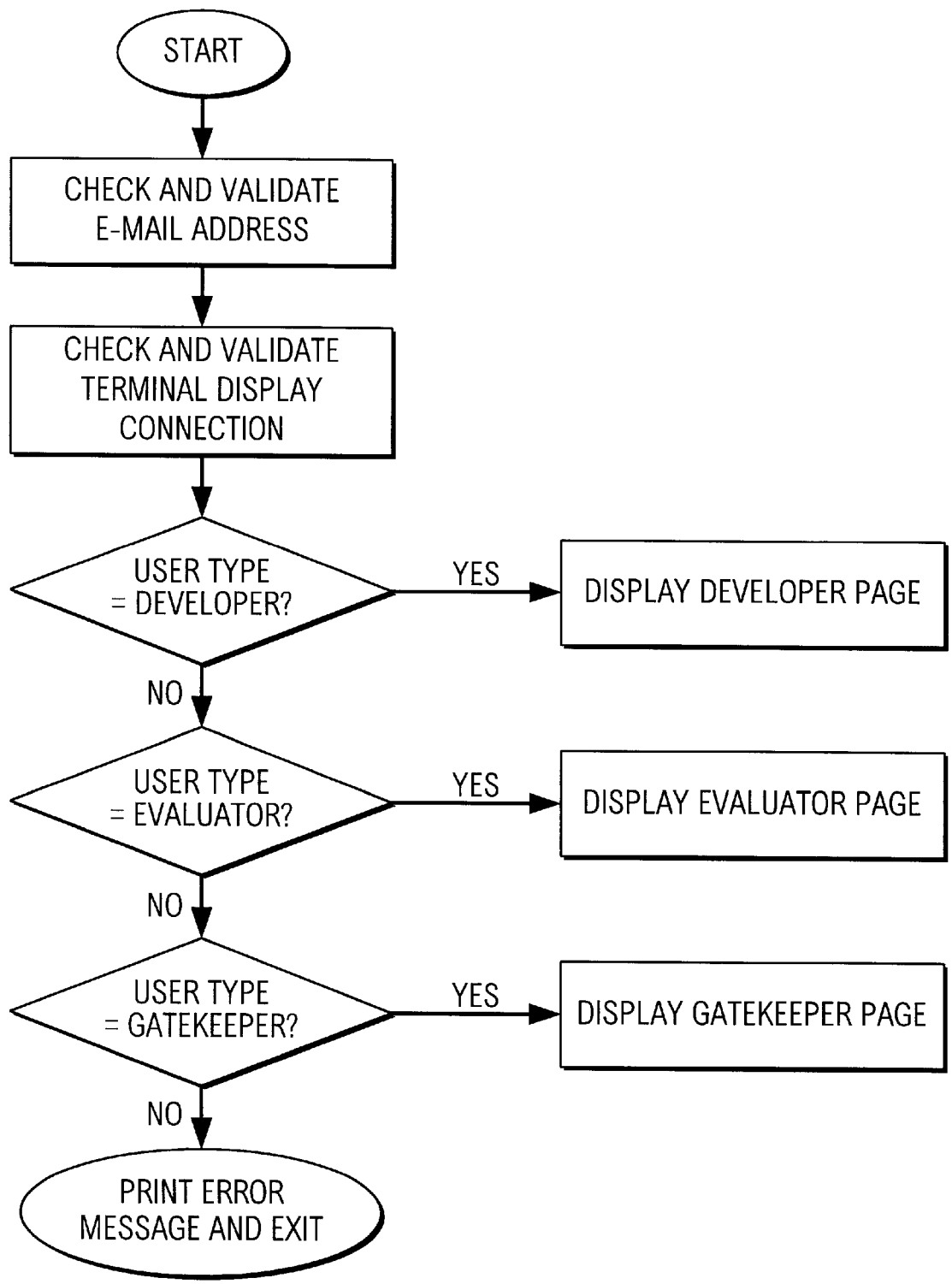

FIG. 8b illustrates how inputs to the home page are processed, and a subpage selected in response there to.

Figure 8C:
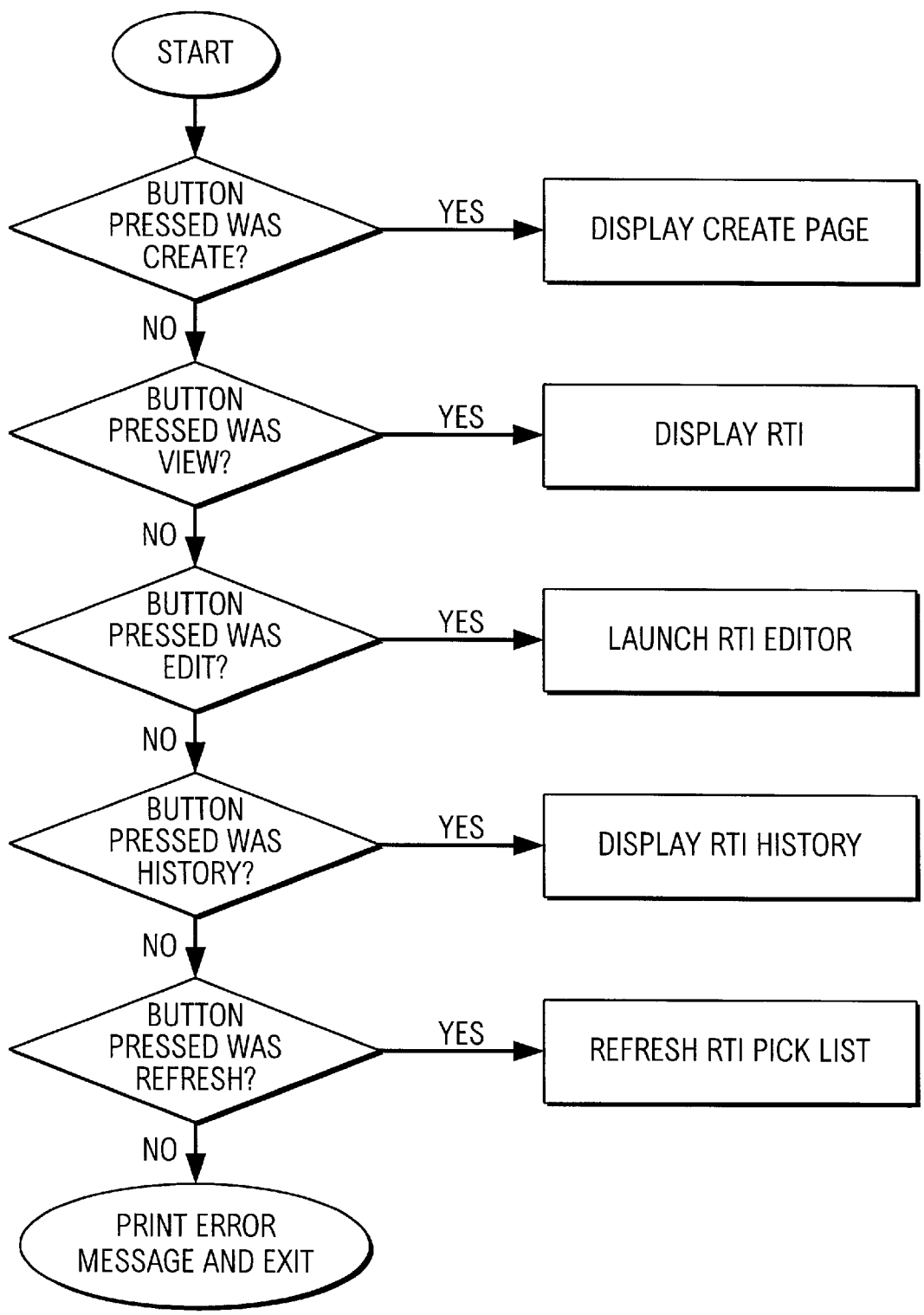

FIG. 8c illustrates how inputs to the developer page are processed, and a create, display, edit, history or refresh operation is performed in response thereto.

Figure 8D:
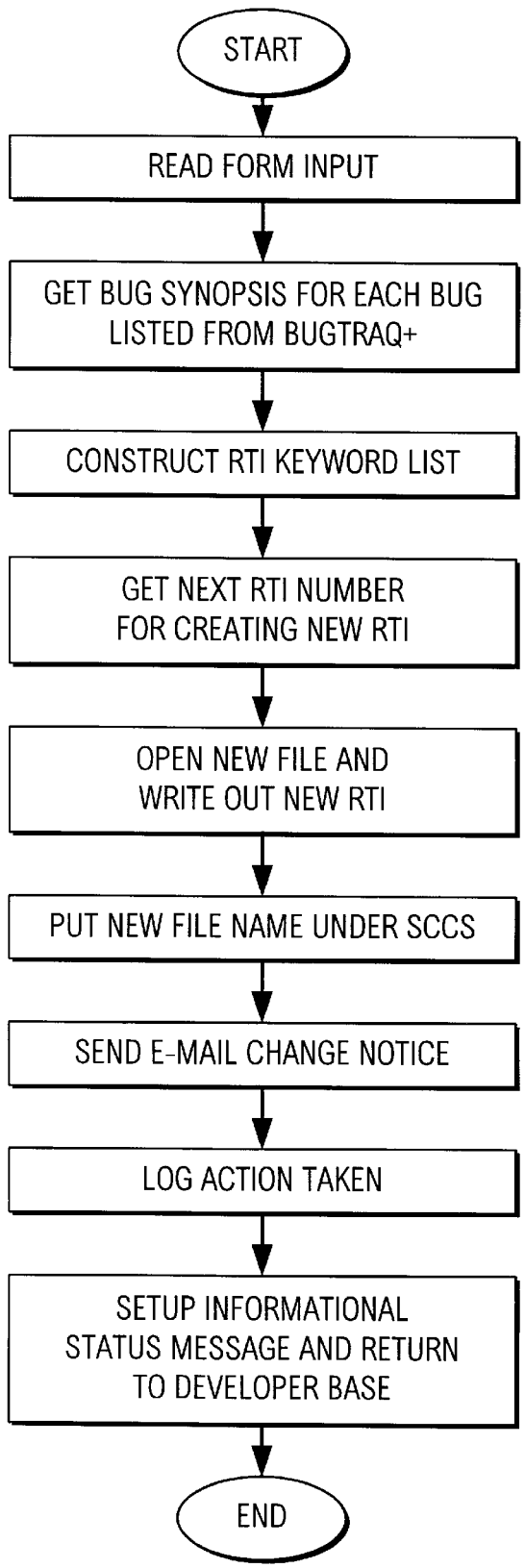

FIG. 8d illustrates how inputs to the create page are processed to create a new RTI.

Figure 8E:
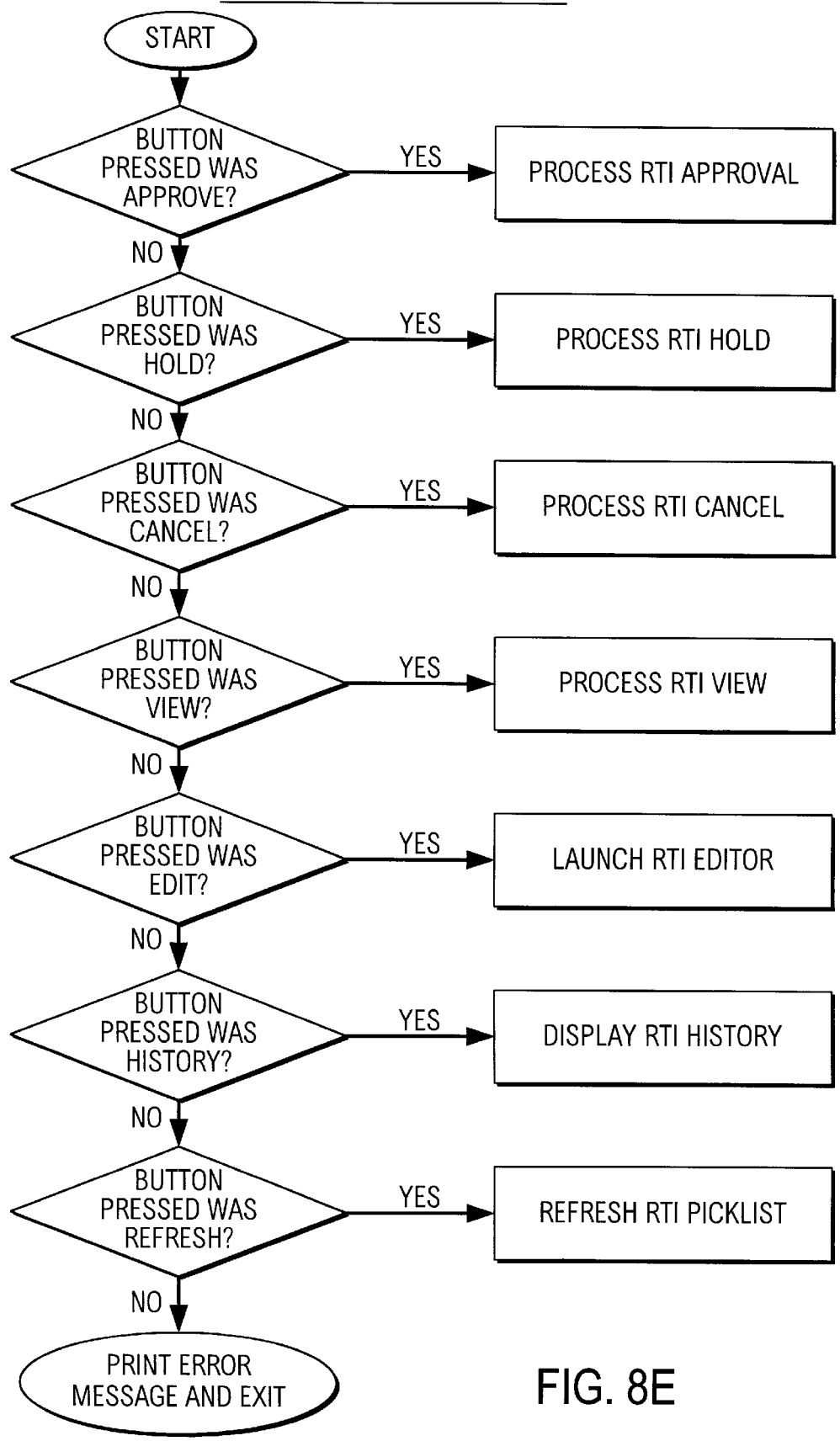

FIG. 8e illustrates how inputs to the evaluator page are processed, and an approve, hold, cancel, view, edit, history or refresh function is performed in response thereto.

Figure 8F:
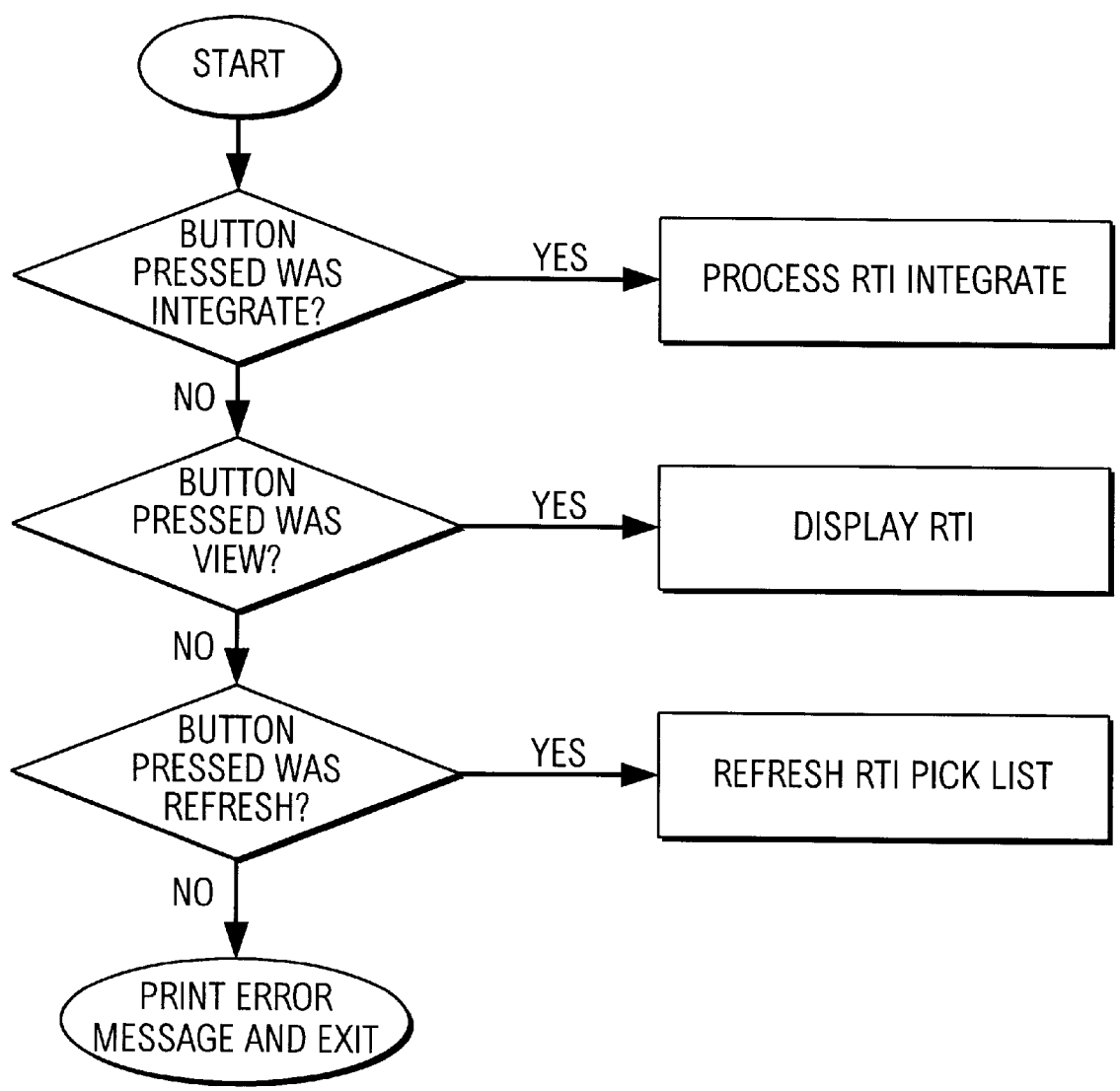

FIG. 8f illustrates how inputs to the gatekeeper page are processed, and an integrate, display or refresh operation is performed in response thereto.

System Access

The Rtitool 20 is accessed by the web browser 12d (e.g. Netscape. A text-only mode will not be supported. The web browser 12d used must support multiple submit buttons in a single form to access the Rtitool 20. The system 10 will detect if a browser cannot meet this requirement during system login through the Rtitool home page, and will give the user an error message with a description of the problem and a suggested resolution.

The RTI system 10 provides an authentication function at login to verify who the user is by accessing the names database 32. This database contains official information on every employee who is authorized to access the system 10. The authentication function compares the e-mail address entered by the user with the e-mail address in the database 32, and refuses system access to the user if the comparison fails.

User Model

The RTI Process Workflow identifies 6 distinct user profiles. The primary users of the system 10 are the Developer, Evaluator and Gatekeeper. Primary users are able to cause RTI state transitions. Secondary users of the system are mainly hunter/gather-type browsers.

As described above, the main functions that the primary users have are listed below. Some of these functions are "active" and some are "passive". Active functions are ones which directly affect an RTI state and will cause an RTI state transition. Passive functions, on the other hand, have no effect on the RTI state. Each function is fully defined in one of the following sections.

A. Developer Functions
1. create
2. view
3. edit
4. history
5. refresh

B. Evaluator Functions
1. approve
2. hold
3. cancel
4. view
5. edit
6. history
7. refresh C. Gatekeeper Functions
1. integrate
2. view
3. refresh As described above, each primary user (Developer, Evaluator, Gatekeeper) has a dedicated home page that is tailored for the tasks to be performed. Only the functions which that user can perform appear on the page. The system places the user at this page following system login. Common to all primary user home pages is an RTI picklist. The picklist displays RTIs which the user can perform some action on. The data shown in the picklist includes: RTI nunder, State, Keywords.

The main functions that the secondary users have are listed below. These functions are available to all users of the RTI system, from any page, and do not require system login.

D. Secondary Functions
1. search
2. report
3. help

The primary and secondary user functions are described in detail below.

Primary User Functions

RTI Create Function

This function enables the user to create an RTI by using a forms-based submittal. The system 10 displays a form which the user fills out by typing text into text boxes. The user can also cut and paste information from OpenWindows applications into the form such as output from a TeamWare putback command. Upon completion of the form, the user presses a submit button and the form is sent to the RTI system for validation.

Upon receipt of the RTI create submission, a validation function processes the form, and based upon project-defined criteria, determines if the RTI can be accepted into the system.

If the RTI is accepted into the system, a number will be assigned to the RTI by a number generator function. The RTI will be placed under SCCS and assigned the RTI state of "New".

The system 10 will then refresh the RTI picklist and give the user an informational message confirming the RTI creation.

RTI View Function

This function enables a user to view an RTI file. The user selects an RTI to view from the RTI picklist by clicking on the RTI and then pressing the View button. The system 10 then gets the RTI and displays it on the display unit 12b. An RTI may include embedded hyperlinks to other documents. In the bugid section, each bugid is a hyperlink which when followed will display the bug report from the bug database 30. Users may wish to embed hyperlinks to test plans and other documents.

RTI Edit Function

This function enables a user to edit an RTI to make additions, deletions or changes. The user selects an RTI to edit from the RTI picklist and presses the Edit button. The system 10 then checks-out the file under SCCS and launches the text editor 12c. If the file cannot be checked out, the user will receive a file busy message.

Once the text editor 12c is up and is displaying the RTI, the user can begin editing the RTI. When the user is finished, he can use the save option and quit the text editor 12c.

The system 10 will ask if the user wants to continue, or cancel the edit operation. If the user responds 'quit', the file will be unchecked-out and the user will be returned back to the Developer or Evaluator page.

If the user responds 'continue', the file will be checked-in, and the user will be returned back to the Developer or Evaluator page. The system 10 will place a delta comment into the RTI SCCS history file 22c indicating who made the change and send a notification message.

RTI History Function

This function enables a user to see the RTI SCCS history comments, and to select any delta from the SCCS history file 22c for viewing.

The user selects an RTI from the RTI picklist, and presses the History button. The system 10 then displays on the display unit 12b the output of a 'SCCS print file' command in html format. In the top section of the output, the SCCS delta number is a hyperlink which the user can select, and the system 10 will then retrieve the version of the RTI file selected and display it on the screen.

RTI Refresh Function

This function enables the user to refresh the RTI picklist display. On each primary user screen there is a button to refresh the RTI picklist display. Since the Rtitool is a web application and the picklist display is not a real time display, the user needs a refresh function to cause the web server to update the display in certain situations.

In most situations, the picklist will be up to date because Rtitool 20 will re-examine the RTIs whenever the page is redisplayed. If the user has not taken any actions that would have repainted the displayed, or used the back button to a previous page, the picklist could be out of date. Pressing the Refresh button causes the picklist to be updated. An example of how this function could be used is if a user left the page up for some period of time, then returned, and wanted to see if there were any changes in the picklist.

RTI Approve Function

This function enables a user to change an RTI state to Approved. The user selects an RTI to approve from the RTI picklist, and presses the Approve button. The system 10 then checks-out the file under SCCS. If the file cannot be checked out, the user will receive a file busy message.

The system 10 asks the user if he wants to provide any comments for the delta commentary. If so, the user can type comments into a text box which will be placed into the file history. The system 10 will delta the file, changing the state to 'Approved', and send a notification message. The system 10 marks each bugid listed in the RTI as 'commit to fix' in the bug database.

RTI Hold Function

This function enables the user to change an RTI state to Hold. The user selects an RTI to hold from the RTI picklist, and presses the Hold button. The system 10 then checks-out the file under SCCS. If the file cannot be checked out, the user will receive a file busy message.

The system 10 asks the user if he wants to provide any comments for the delta commentary. If so, the user can type comments into a text box which will be placed in to the file history. The system 10 will then delta the file, changing the state to 'Hold', and send a notification message.

RTI Cancel Function

This function enables the user to change an RTI state to Canceled. The user selects an RTI to cancel from the RTI picklist, and presses the Cancel button. The system 10 then checks-out the file under SCCS. If the file cannot be checked out, the user will receive a file busy message.

The system 10 will ask the user if he wants to provide any comments for the delta commentary. If so, the user can type comments into a text box which will be placed into the file history. The system 10 will delta the file, changing the state to 'Canceled', and send a notification message.

RTI Integrate Function

This function enables a user to change an RTI state to Integrated. The user selects an RTI to integrate from the RTI picklist, and presses the Integrate button. The system 10 then checks-out the file under SCCS. If the file cannot be checked out, the user will receive a file busy message.

The user selects which build to buildstamp the RTI from a pop-up list of release names. The system 10 will delta the file, changing the state to 'Integrated' and send a notification message. The system 10 then marks each bugid listed in the RTI as 'fixed' and 'integrated' in the bug database 30.

Secondary User Functions

In addition to the functions listed below, the web browser 12d provides file print, save, mail and other functions useful to the user, but are not described further herein.

RTI Search Function

This function enables the user to search and display RTIs in the RTI database 22 based upon keyword matching using the WAIS server 24 and WAIS database 26. The user can enter a list of keywords with optional search modifiers which are to be searched for in the RTI database 22. The scope of the search can be adjusted by selecting which projects are searched.

Search results returned include the RTI number, and a short synopsis derived from the RTI to give the user a sense of what the RTI contains. The RTI number is used as a hyperlink which the user can click on, and the system 10 displays the full text of the RTI.

RTI Report Function

This function enables a user to generate a report from a menu selection of pre-defined report formats. Several types of pre-defined reports are provided for the most frequently requested types of data.

RTI Help Function

This function enables the user to obtain on-line help for details about how to use the Rtitool 20. The help page provides details on how to use the Rtitool 20 that covers the most frequently asked questions such as what the RTI state transitions mean, how to begin using Rtitool, etc.

Miscellaneous System Functions

RTI Validation Function

This function validates an RTI submission based upon project-specific criteria. At a minimum, the validation function verifies that the bugids listed in the RTI have been evaluated, and will reject the submission if any bugids have not been evaluated.

RTI Number Generator Function

This function gets the next available RTI number for a new RTI. The system 10 keeps a record of the last RTI number that was used. When a new RTI number is needed, the system 10 retrieves the last RTI number and increments it for the new number. A locking mechanism is used to prevent simultaneous users from getting the same RTI number.

RTI Change Notification Function

This function informs the user that a change to an RTI has occurred. The system 10 sends an e-mail message to the Originator of the RTI, the project Evaluator and Gatekeeper, and e-mail addresses listed in the RTI Interest list field whenever one of the following events occurs.

1. An RTI is created.
2. An RTI state changes (Approved, Hold, Canceled, Integrated).
3. An RTI is edited.

The change notice indicates what type of change occurred, and useful information from the RTI header such as: file id, state, project, originator, build.

System Message Handling Function

System messages provide status to the user and system administrator. Three message categories are defined.

1. Informational

Informational messages are used to give the user positive feedback about some action he has taken such as approving an RTI. An informational message is a one-line message that appears directly under the Rtitool navigation bar.

2. Warning

Warning messages are used to tell a user that he has taken some action which requires remedial action such as mistyping his e-mail address during login. The warning message appears on a separate page.

3. Fatal

Fatal messages are used to tell a user and the system administrator that a serious internal system error has occurred. The user will see a message that tells him to contact the system administrator. The system administrator will find the fatal error message in the web server error log file.

System Logging Function

This function enables the system administrater to track system activity. In addition to a usual access log and error log provided by the web server 18, the Rtitool 20 maintains the action log 28 to track the usage of the system 10 by the users. The action log file preferably contains the following data: date, type of action, project, RTI selected, user e-mail address, user remote host name, user remote host address. This information is formatted in a one-line record within the action log file.

System Housekeeping Function

This function cleans up old RTI files that may have been checked-out for editing, but not checked-in after a pre-set time limit. It is possible that a user took some action which resulted in an RTI file being checked out but never checked back in. The housekeeping function periodically sweeps the system 10 of such files by performing an 'sccs unedit' on the files. This type of function can run on the web server 18 and be set up and maintained by the system administrator.

System Security Function

This function enables login to a primary user home page to be restricted. It may be desirable to restrict the login to certain primary user pages such as Evaluator or Gatekeeper. This can be accomplished by checking a security flag in the project configuration file, and if security is turned on, the system 10 will compare the user e-mail address with the name in the project configuration file. A second level of security can be arranged so that a password is required to access the primary user pages.

SUMMARY AND ADVANTAGES OF THE INVENTION

In summary, the present invention provides innovative features and advantages including the following.

Web-Based, providing a platform-independent solution with support for SPARC, X86 and PPC. RTIs are stored at displayed as hypertext documents and can have embedded hyperlinks to other documents.

Database-oriented. RTIs are simple ASCII files maintained under the Source Code Control System (SCCS) which provides a file locking and history mechanism.

Bug Tracking System Interface. Includes a programmatic interface to a Sybase bug database.

Ease of use. An intuitive user interface supports casual users.

Powerful Search and Reporting. Includes a search engine which locates and displays RTIs, and creates standard and custom RTI reports.

Ease of maintenance. The system is written in Perl, no X-windows or C code.

Various modifications will become possible for those skilled in the art after receiving the teachings of the present disclosure without departing from the scope thereof.

For example, it is within the scope of the invention to provide only one terminal 12, and/or to integrate the terminal 12 and server unit 14 together into a single assembly at one location.

As another alternative, the Java text editor 12c in each terminal 12 can be omitted, and a text editor which is used by all terminals can be provided in the server unit 14.

Furthermore, the WAIS server 24 and database 26 can be replaced by another search engine such as "Harvest", which is available from the University of Colorado.

I claim:

1. A computer implemented Request To Integrate (RTI) system configured to manage change control in a software release stream, comprising:

a user unit including an input unit and a display; and a server unit which is connected to the user unit and configured to create and store RTI files representing requests to integrate changes into the software release stream, and to cause a selected RTI file to be displayed on the display unit under control of the input unit, in which:

the server unit is configured to create the RTI files in a World Wide Web (WWW) text format;

the user unit comprises a WWW browser;

the server unit comprises a WWW server which communicates with the WWW browser;

the input unit communicates with the WWW server through the WWW browser;

the WWW server communicates with the display through the WWW browser;

the server unit stores and executes a program which includes a WWW page, communicates with the WWW server, and is configured to create and store the RTI files through the WWW page; and the WWW page comprises:
 a home page; and
 a developer page, an evaluator page, and a gatekeeper sage which are accessible through the home page under control of the input unit.

2. A system as in claim 1, in which the server unit is further configured to enable editing of a selected RTI file under control of the input unit.

3. A system as in claim 1, in which the server unit comprises a database in which the RTI files are stored.

4. A system as in claim 3, further comprising a search engine which is configured to search the database under control of the input unit.

5. A system as in claim 4, in which the RTI files are stored in the database under the Source Code Control System (SCCS).

6. A system as in claim 5, in which the server unit is further configured to enable a change history of a selected RTI file to be displayed on the display unit under control of the input unit.

7. A system as in claim 1, in which the developer page, the evaluator page and the gatekeep page each enable a selected RTI to be viewed under control of the input unit.

8. A system as in claim 1, in which the developer page and the evaluator page each enable a selected RTI to be edited under control of the input unit.

9. A system as in claim 1, in which the developer page enables a new RTI to be created under control of the input unit.

10. A system as in claim 1, in which the evaluator page enables a selected RTI to be selectively approved for release into the software release stream, placed on hold, or canceled under control of the input unit.

11. A system as in claim 1, in which the gatekeeper page enables a selected RTI to be integrated into the software release stream under control of the input unit.

12. A system as in claim 1, further comprising a software bug database, in which:
 the WWW page includes hyperlinks configured to enable the software bug database to be accessed under control of the input unit.

13. A system as in claim 1, further comprising a user name database, in which:
 the WWW page is further configured to access the user name database to verify a user name input through the input unit, and to prevent RTI files from being displayed on the display unit until a user name is verified.

14. A computer implemented method for managing change control in a software release stream, comprising the steps of:
 (a) providing a computer system including:
  at least one input unit; and
  a server unit which is connected to said at least one input unit and is configured to create Request To Integrate (RTI) files representing requests to integrate changes into the software release stream, and to perform operations specified by developer data, evaluator data and gatekeeper data which is input through said at least one input unit;
 (b) creating an RTI file by inputting developer data through said at least one input unit; and
 (c) approving the RTI file by inputting evaluator data through said at least one input unit, in which:
  the server unit is configured to create the RTI files in a World Wide Web (WWW) text format;
  the user unit comprises a WWW browser;
  the server unit comprises a WWW server which communicates with the WWW browser;
  the input unit communicates with the WWW server through the WWW browser;
  the WWW server communicates with the display through the WWW browser;
  the server unit stores and executes a program which includes a WWW page, communicates with the WWW server, and is configured to create and store the RTI files through the WWW page; and
  the WWW page comprises:
   a home page; and
   a developer page, an evaluator page, and a gatekeeper page which are accessible through the home page under control of the input unit.

15. A method as in claim 14, further comprising the step of:
 (d) enabling the changes represented by the RTI file to be integrated into the software release stream by inputting gatekeeper data through said at least one input unit.

16. A method as in claim 14, further comprising the step, performed between steps (b) and (c), of:
 (d) placing the RTI file on hold be inputting evaluator data through said at least one input unit.

17. A method as in claim 14, further comprising the step of:
 (d) canceling the RTI file by inputting evaluator data through said at least one input unit.

18. A digital data storage structure which stores a computer program for managing change control in a software release stream for implementation using a computer system which includes at least one input unit, and a server unit which is connected to said at least one input unit and is configured to create Request To Integrate (RTI) files representing requests to integrate changes into the software release stream, and to perform operations specified by developer data, evaluator data and gatekeeper data which is input through said at least one input unit, the computer program being executed by the server unit and including instructions for performing the steps of:
 (a) creating an RTI file in response to developer data input through said at least one input unit; and
 (b) approving the RTI file in response to evaluator data input through said at least one input unit, in which:
  the server unit is configured to create the RTI files in a World Wide Web (WWW) text format;
  the user unit comprises a WWW browser;
  the server unit comprises a WWW server which communicates with the WWW browser;
  the input unit communicates with the WWW server through the WWW browser;
  the WWW server communicates with the display through the WWW browser;
  the server unit stores and executes a program which includes a WWW page, communicates with the WWW server, and is configured to create and store the RTI files through the WWW page; and
  the WWW page comprises:
   a home page; and
   a developer page, an evaluator page, and a gatekeeper page which are accessible through the home page under control of the input unit.

19. A structure as in claim 18, in which the program further includes instructions for performing the step of:
(c) enabling the changes represented by the RTI file to be integrated into the software release stream in response to gatekeeper data input through said at least one input unit.

20. A structure as in claim 18, in which the program further includes instructions for performing the step, performed between steps (a) and (b), of:
(c) placing the RTI file on hold in response to evaluator data input through said at least one input unit.

21. A structure as in claim 18, in which the program further includes instructions for performing the step of:
(c) canceling the RTI file in response to evaluator data input through said at least one input unit.

22. A structure as in claim 18, comprising an electronic memory configured to store the computer program.

23. A structure as in claim 18, comprising at least one digital recording medium configured to store the computer program.

* * * * *